United States Patent [19]

Herd et al.

[11] Patent Number: 5,554,731
[45] Date of Patent: Sep. 10, 1996

[54] PROCESS FOR THE PREPARATION OF AMINOAZO DYES

[75] Inventors: Karl-Josef Herd, Odenthal-Holz; Peter Roschger, Cologne, both of Germany

[73] Assignee: Bayer Aktiengesellschaft, Leverkusen, Germany

[21] Appl. No.: 310,462

[22] Filed: Sep. 22, 1994

Related U.S. Application Data

[60] Division of Ser. No. 41,741, Apr. 1, 1993, Pat. No. 5,432,266, which is a continuation-in-part of Ser. No. 898,859, Jun. 15, 1992, abandoned.

[30] Foreign Application Priority Data

Jun. 22, 1991 [DE] Germany ............... 41 20 696.7
Aug. 10, 1992 [DE] Germany ............... 42 26 374.3

[51] Int. Cl.$^6$ .................. C09B 62/503; C09B 62/505; C09B 62/51; C09B 62/513

[52] U.S. Cl. ............... 534/593; 534/588; 534/574
[58] Field of Search ................ 534/642, 617, 534/632, 638, 643, 588, 594, 618, 593; 564/440; 8/515

[56] References Cited

U.S. PATENT DOCUMENTS

| 4,992,589 | 2/1991 | Fuchs et al. | 564/440 |
| 5,107,025 | 4/1992 | Herd | 564/440 |
| 5,432,266 | 7/1995 | Herd et al. | 534/642 |

*Primary Examiner*—Floyd D. Higel
*Attorney, Agent, or Firm*—Sprung Horn Kramer & Woods

[57] ABSTRACT

Preparation of water-soluble reactive dyes containing vinylsulphonyl and β-sulphatoethylsulphonyl groups by the oxidation of dyes containing β-hydroxyethylmercapto radicals, and then sulphation and, if appropriate, conversion of the β-sulphatoethylsulphonyl radical to the vinylsulphonyl radical with bases.

2 Claims, No Drawings

PROCESS FOR THE PREPARATION OF AMINOAZO DYES

This is a division of application Ser. No. 08/041,741 (filed on Apr. 1, 1993) now U.S. Pat. No. 5,432,266; which is a continuation-in-part of application Ser. No. 07/898,859 (filed on Jun. 15, 1992), now abandoned.

Various processes for the preparation of reactive dyes are already known, but they are not always satisfactory.

The invention relates to (A) a process for the preparation of water-soluble reactive dyes containing vinylsulphonyl (or β-sulphatoethylsulphonyl) groups, of structure (1) (B) to novel fibre-reactive monoazo and disazo dyes of the structure (Ia), and (C) to a process for colouring polyurethane plastics with monoazo dyestuffs, some of which are new.

In aspect (A) the reactive dyes are of structure (I)

wherein

A=a chromophoric radical from the azo, polyazo, anthraquinone, formazane or triphendioxazine series, which is preferably substituted by at least one —$SO_3H$ group, and X=CH=$CH_2$ or $CH_2CH_2OSO_3H$, and are produced by oxidizing and sulphating mercapto compounds of the structure

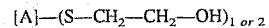

and, if appropriate, the sulphatoethylsulphonyl radical is converted to the vinylsulphonyl radical with bases.

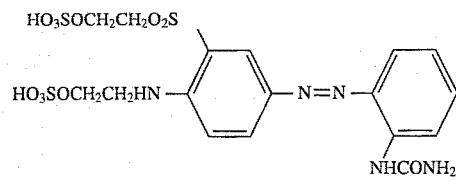

Although Japanese patent document A-44 24 899 has already disclosed a process for the preparation of β-sulphatoethylsulphonyl-substituted dyes by the oxidation of a thioether, said process is restricted to phthalocyanines.

With regard to aspect (B), the present invention further relates to novel fibre-reactive monoazo and disazo dyes of the structure

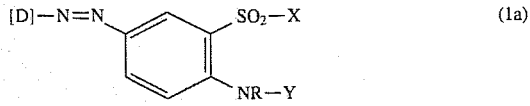

wherein

D=a radical of a diazo component from the benzene or naphthalene series, which, in addition to any desired number of sulpho or carboxyl groups, can also contain substituents, preferably $C_1$-$C_4$-alkyl, $C_1$-$C_4$-alkoxy, phenoxy, halogen, acetylamino, benzoylamino, ureido, phenylsulphonyl or $C_1$-$C_4$-alkylsulphonyl, and unsubstituted or substituted phenylazo or naphthylazo substituents and fibre-reactive groups such as $SO_2X$, $CH_2SO_2X$ or heterocyclic pyrimidine- or triazine-reactive systems, excepted substituents being OH, $NH_2$, monoalkylamino or dialkylamino, or arylamino—such as anilino, X=CH=$CH_2$ or $CH_2CH_2OSO_3H$ and Y=H, $C_1$-$C_6$-alkyl, Cl—, OH—, CN— $CO_2H$—, $OSO_3H$—, $SO_3H$—, $SO_2X$— or $C_1$-$C_4$-alkoxy-substituted $C_1$-$C_6$-alkyl, allyl, cycloalkyl, such as for example cyclohexyl, cyclopentyl or cyclopropyl, $CO_2H$—, $OSO_3H$— or $SO_3H$-substituted cycloalkyl, benzyl or OH—, $CO_2H$— or $SO_3H$-substituted benzyl, but in particular $CH_2CH_2OSO_3H$, R=H, $C_1$-$C_4$-alkyl, Cl—, OH—, CN—, $CO_2H$—, $OSO_3H$—, $SO_3H$—, $SO_2X$— or $C_1$-$C_4$-alkoxy-substituted $C_1$-$C_4$-alkyl, allyl, benzyl or OH—, $CO_2H$— or sulpho-substituted benzyl, but in particular H.

The grouping NR—Y also represents a saturated N-heterocycle, such as, for example:

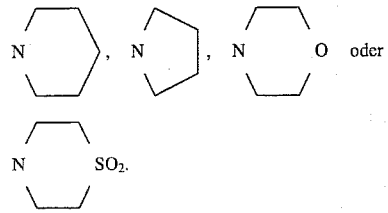

Substituents on the phenylazo and naphthylazo group are preferably sulpho, carboxy, $C_1$-$C_4$-alkyl, $C_1$-$C_4$-alkoxy, halogen, $SO_2X$ and —$CH_2SO_2X$.

German patent document A-3 512 340, a representative compound of which being e.g. Example 32 of the formula

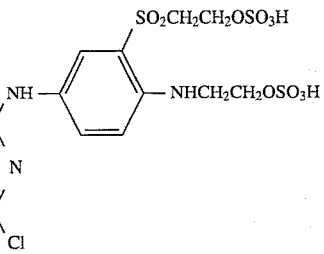

wherein the azo group, which links the ureido substituted phenyl and the triazine rest should be a —NH-group has already disclosed azo-reactive dyes which simultaneously carry a β-sulphatoethylsulphonyl radical and a β-sulphatoethylamino radical on a phenyl radical. However, these groups are part of the diazo component whereas, according to the invention, these groups are part of the coupling component.

Preferred dyes are those of structures (2) and (3):

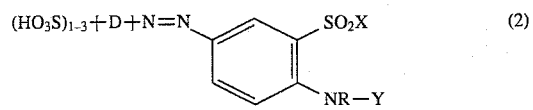

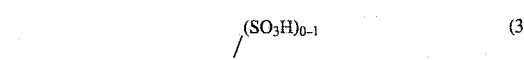

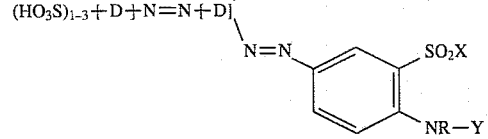

wherein

D=a phenylene or naphthylene radical which can additionally be substituted by carboxyl, $C_1$–$C_1$-alkyl, $C_1$–$C_4$-alkoxy, phenoxy, halogen, $C_1$–$C_4$-alkylsulphonyl, $SO_2X$, $CH_2SO_2X$ or a fibre-reactive heterocyclic pyrimidine- or triazine-reactive radical, it being possible for the meanings of both groups —D— in formula (3) to be identical or different.

It is particularly preferable to us9 bifunctional fibre-reactive dyes of structures (4) to (8):

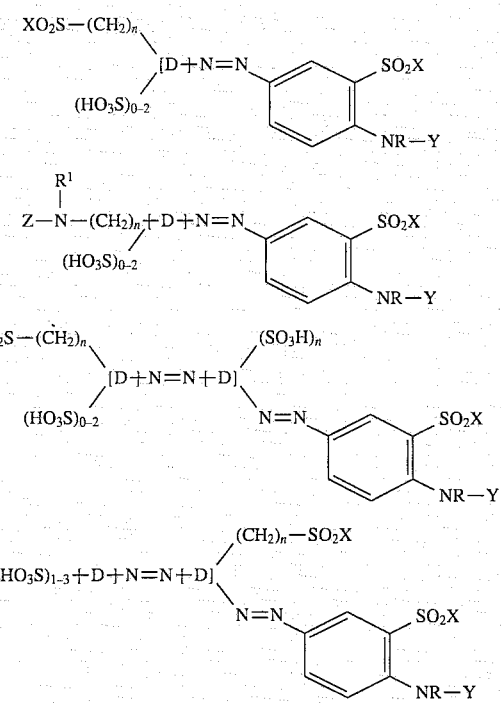

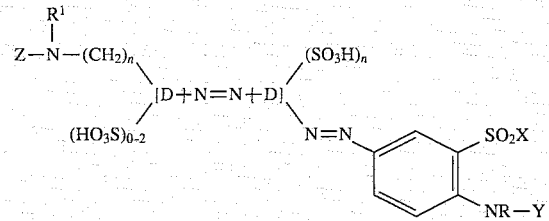

wherein n=0 or 1, $R^1$=H or $C_1$–$C_4$-alkyl,

Z=a fibre-reactive halogen-containing radical from the triazine or pyrimidine series, D=a phenylene or naphthylene radical which can additionally be substituted by carboxyl, methyl, ethyl, methoxy, ethoxy, chlorine, bromine or fluorine, it being possible for the meanings of both groups D in formulae (6), (7) and (8) to be identical or different, and R, X and Y are as defined under formula (1a).

The fibre-reactive radical Z represents chlorine- or fluorine-containing triazine or pyrimidine radicals such as e.g. those described in European patent document A-395 951, preferably a monofluoro- or monochloro- triazine radical or a 5-chloro-2,6-difluoro-4-pyrimidinyl or 5-chloro-6-fluoro-4-pyrimidinyl radical. Selected dyes are those of structures (9) to (19):

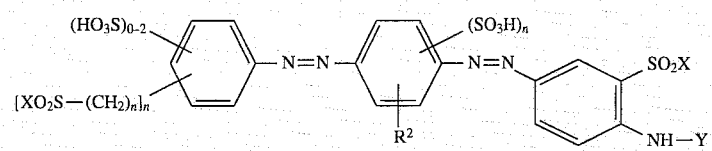

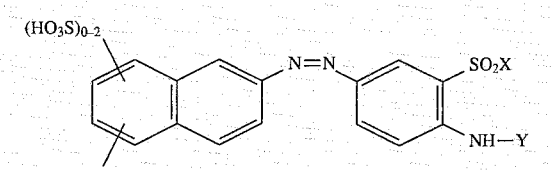

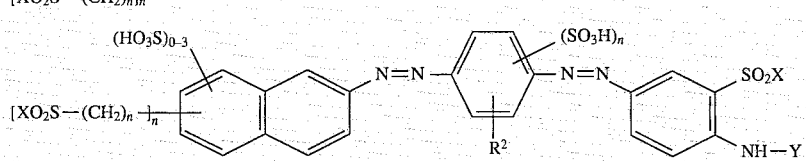

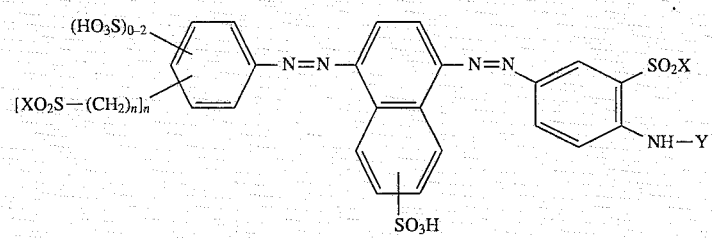

-continued
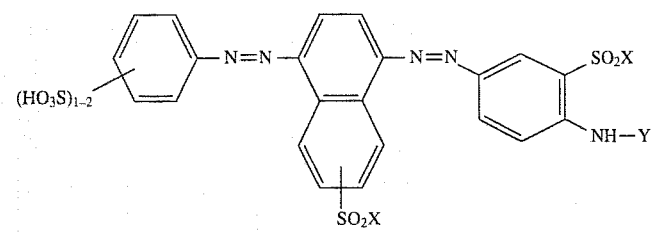 (13)
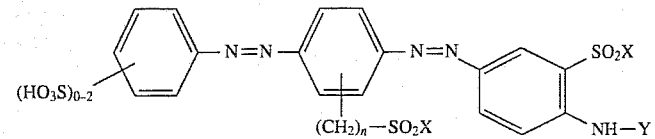 (14)
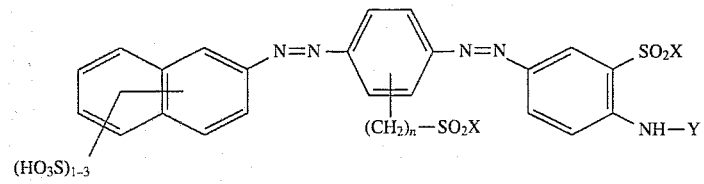 (15)
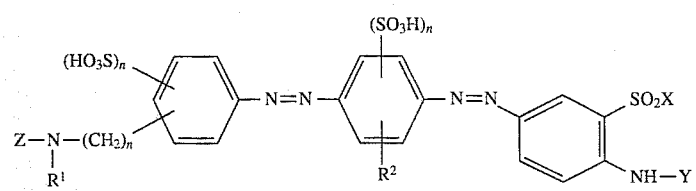 (16)
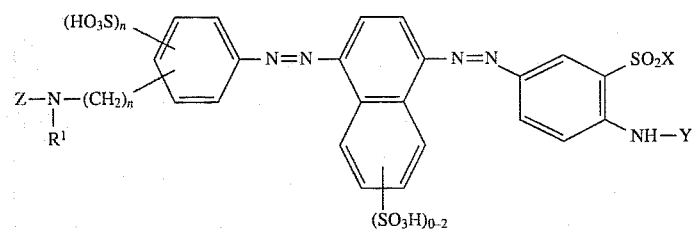 (17)
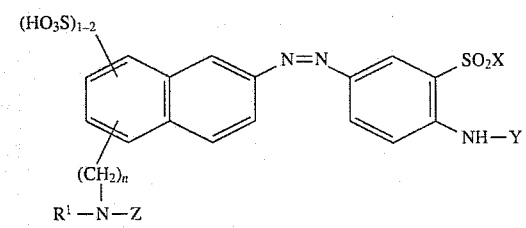 (18a)
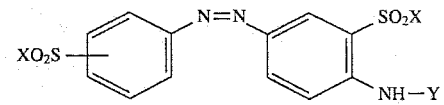 (18b)
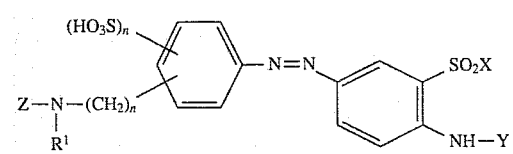 (19)
wherein
$R^2$=H, $CH_3$, $OCH_3$, Cl or $CH_2SO_2X$
and the other substituents n, $R^1$, Z, X and Y are as defined under formula (8).
Of these selected types of dye of structures (9) to (19), it is particularly preferable to use those in which the radical $Y=CH_2CH_2OSO_3H$, such as e.g. dyes of structures (20) to (31):

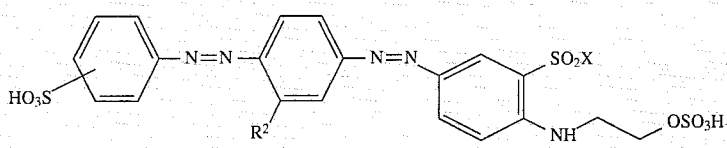
(20)
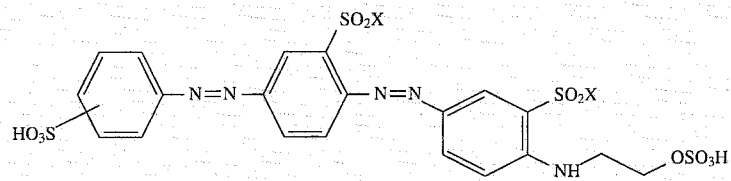
(21)
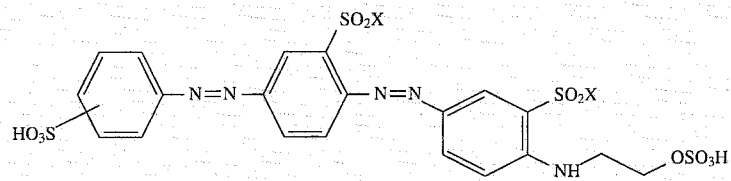
(22)
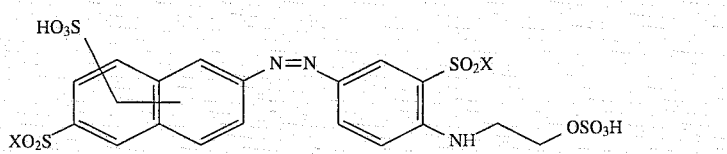
(23)
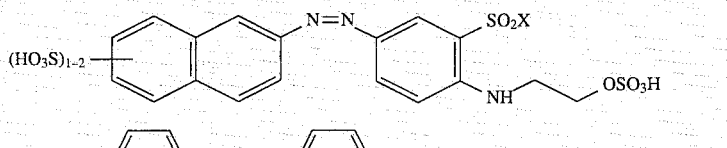
(24)
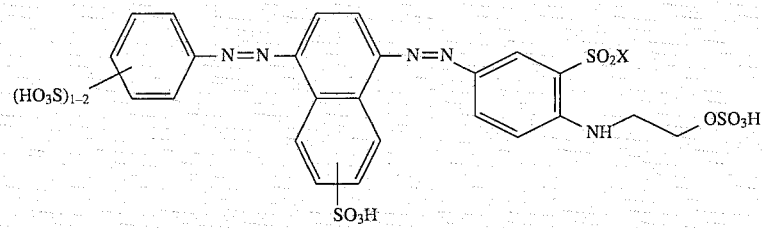
(25)
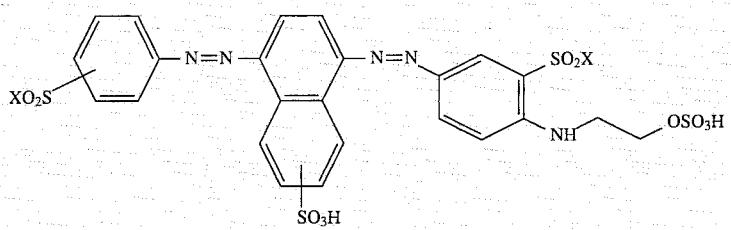
(26)
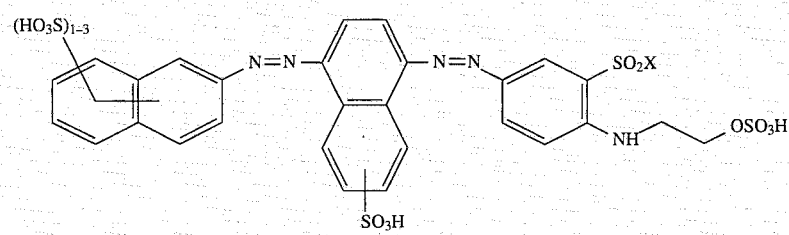
(27)
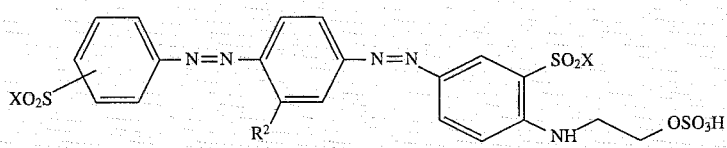
(28)
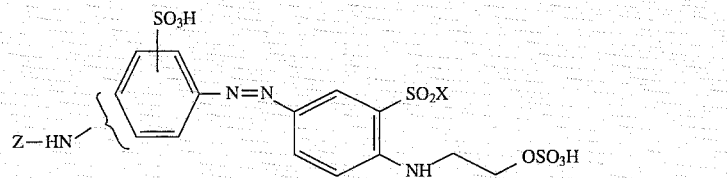

-continued

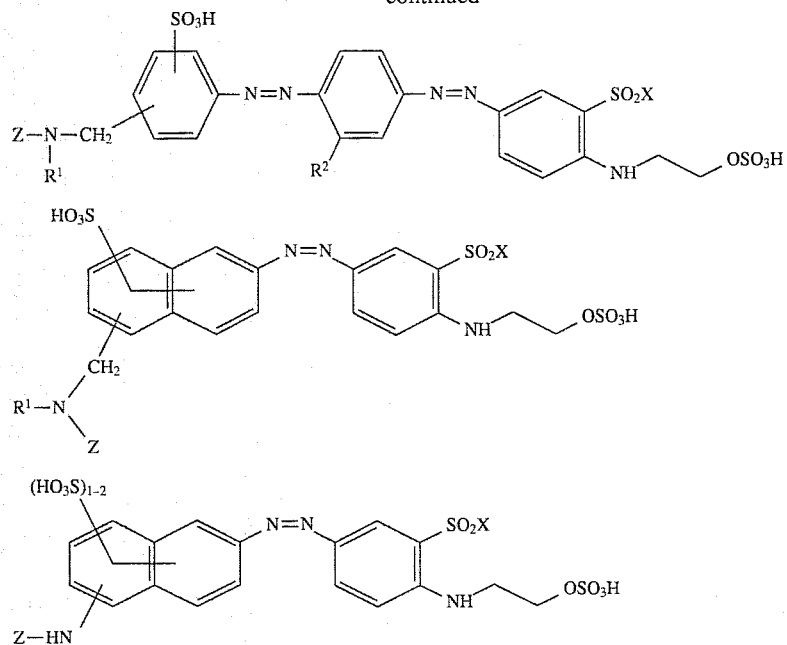

wherein the substituents are as follows:

$R^1$=H or $C_1$–$C_4$-alkyl, $R^2$=H, $CH_3$, $OCH_3$, Cl or $CH_2SO_2X$,

X=—CH=$CH_2$ or —$CH_2CH_2OSO_3H$ and

Z is as defined under formula (8).

The preparation of the dyes (1a), wherein A from formula (1) is to be treated as equivalent to the radical

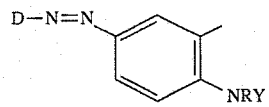

is carried out by oxidising thio compounds of structure (32):

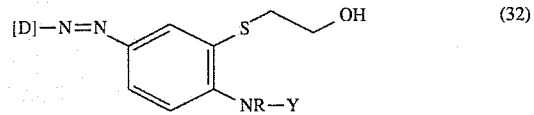

wherein

Y=is as defined under (1a), and is in particular $CH_2CH_2OH$, and

D and R are as defined under (1a), as described in European patent document A-137 417 to sulphones of structure (33):

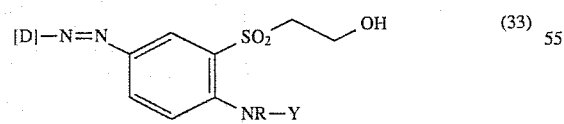

and sulphating the latter in known manner to give (1a) in which X=$CH_2CH_2OSO_3H$.

In this reaction hydroxyalkyl groups in R and Y in (33) are converted into sulphatoalkyl groups.

One particular embodiment of the process consists in oxidising compounds of the structure $$[A]\text{—}(S\text{—}C_2H_4\text{—}OH)_{1\ or\ 2} \qquad (34)$$

or (32) in an aqueous medium with hydrogen peroxide solution, if appropriate under catalysis with tungstate or vanadate, at temperatures in the range from 20° to 100° C., preferably at 60°–80° C., and at pH values of between 5 and 10, preferably of between 7 and 9, and sulphating the resulting isolated sulphones in concentrated sulphuric acid, sulphuric acid monohydrate, oleum or sulphur trioxide, at temperatures of between 0° and 40° C., to give (1) or (1a) in which X=sulphatoethyl.

Dyes in which X=vinyl are produced by known procedures from those in which X=sulphatoethyl at elevated pH values, for instance at pH 9–11.

Another preferred embodiment of the process consists in carrying out the sulphation and oxidation simultaneously by reacting compounds (34):

$$[A]\text{—}(S\text{—}C_2H_4\text{—}OH)_{1\ or\ 2} \qquad (34)$$

or (32) with peroxodisulphates in concentrated sulphuric acid, sulphuric acid monohydrate or oleum at 10°–50° C.

The intermediates of structure (32) are obtained by the azo coupling of diazotised [D]—$NH_2$ with compounds of structure (35):

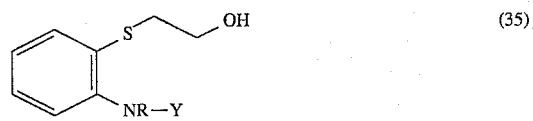

These coupling components (35) can be prepared by ethoxylating o-aminothiophenol and N-substituted o-aminothiophenols with ethylene oxide or chloroethanol under alkaline conditions. The component (35) in which R=H and $Y^1$=$CH_2CH_2OH$ can be obtained by reacting benzthiazole, ethylene oxide and water and then hydrolysing the resulting N-formyl compounds (36):

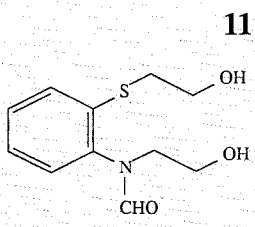

R-Substituted o-aminothiophenols are obtained simply by alkylating benzthiazole and then hydrolysing the ammonium compounds (37):

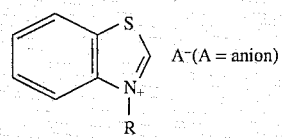

with ring opening.

Another method of preparing compounds (35) comprises alkylating precursors of the formula

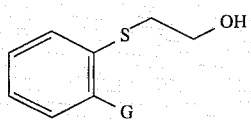

wherein

G=NH$_2$, NHR or NHY.

The alkylation can be carried out for example with alkyl halides R-Hal or Y-Hal, in which Hal=Cl, Br, or F, or with activated olefins, such as for example acrylic acid derivatives or vinyl sulphonyl derivatives, or by reduction with aldehyde derivatives.

Preferred coupling components (35) are those in which the radicals R and Y are substituted by a sulpho, carboxyl or, in particular, a hydroxyl group.

Reactive dyes of structure (7) can also be prepared by oxidising and then sulphating thio compounds of structure (38):

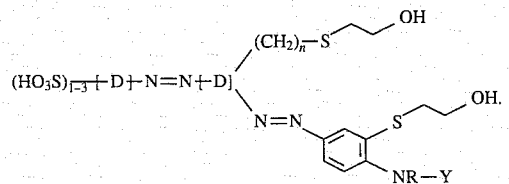

Corresponding intermediates (38) are obtained e.g. by diazotising thio compounds of formula (39):

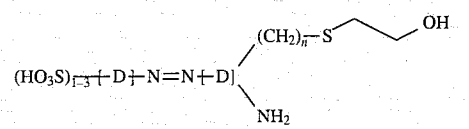

or (32) in which Y and R=H and then coupling the products with compounds of structure (35).

Reactive dyes of structure (5) can also be prepared by condensing dyes of structure (40):

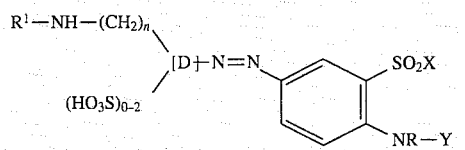

which can be obtained as described for (1a), with a heterocyclic reactive component Z-Hal, wherein Hal=Cl or F, in the presence of acid-binding agents, in known manner. This preparative process can also be applied to the dyes (8).

The formulae given are those of the free acids. The preparation generally produces the salts, especially the alkali metal salts such as the sodium, potassium or lithium salts.

The novel dyes according to the invention are suitable for dyeing and printing materials containing hydroxyl and amide groups, especially wool and cellulose materials. They are distinguished by a high reactivity and a high degree of fixation. The yellow, orange and brown dyeings and prints obtainable with these dyes are moreover distinguished by a high fibre-dye bond stability and by an outstanding stability towards oxidising agents such as detergents containing peroxide or chlorine.

The dyes can be used as both solid formulations and concentrated solutions. They are also suitable for use in mixtures with other reactive dyes, especially for trichromatic dyeing.

Pursuant to aspect (C) hereinabove, the invention also relates to a process for colouring polyurethane plastics using monoazo dyestuffs which are suitable for incorporation in the plastic with the formation of covalent bonds. Such dyestuffs for polyurethane plastics are disclosed, for example, in U.S. Pat. No. 4,751,254 and GB-A-1,472,379, but have some disadvantages with respect to the demands made on them. A process for colouring polyurethane plastics with dyestuffs has now been found which is characterised in that at least one dyestuff of the formula

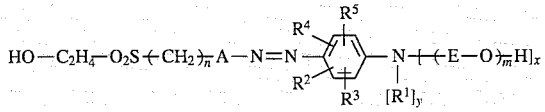

in which

A represents phenylene or naphthylene, each of which is optionally substituted by alkyl or halogen, E represents $C_1$–$C_4$-alkylene, $R^1$ represents hydrogen or represents a $C_1$–$C_6$-alkylene radical which is optionally substituted by —Cl, —CN, amino, alkylamino, dialkylamino, $C_1$–$C_4$-alkoxycarbonyl, aminocarbonyl and/or phenyl, $R^2$, $R^3$, $R^4$ and $R^5$ independently of one another represent hydrogen, halogen, hydroxyl, amino, acylamino or $C_1$–$C_6$-alkyl, or $C_1$–$C_6$-alkoxy, mono-or di-$C_1$–$C_6$-alkylamino, $C_1$–$C_6$-alkylthio, $C_1$–$C_6$-alkysulphoxide or $C_1$–$C_6$-alkylsulphonyl, each of which is optionally substituted by hydroxyl or $C_1$–$C_4$-alkylene oxide units, or two of these radicals complete a fused benzene ring, which is optionally substituted, m represents a number from 1 to 4, preferably 1 or 2 n represents a number from 0 to 2, x represents 1 or 2, and y represents 0 or 1, the sum of x and y being 2, is added to the reaction mixture or to one of the starting components before or during the polyaddition reaction.

A process using dyestuffs of the formula

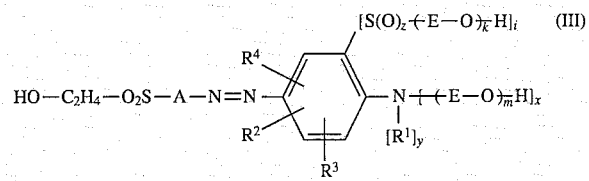

in which

A represents 1,2-, 1,3- or 1,4 -phenylene or 2,6-naphthylene, each of which is optionally substituted by methyl, ethyl, chlorine or bromine, $R^2$, $R^3$ and $R^4$ independently of one another represent hydrogen, methyl, ethyl, n-propyl, isopropyl, chlorine, acylamino or methoxy, i denotes the number 0 or 1, k denotes a number from 1 to 4, z denotes a number from 0 to 2, and E, $R^1$, m, x and y have the abovementioned meanings, is of particular interest in this context.

In a very particularly preferred process variant, dyestuffs of the formula

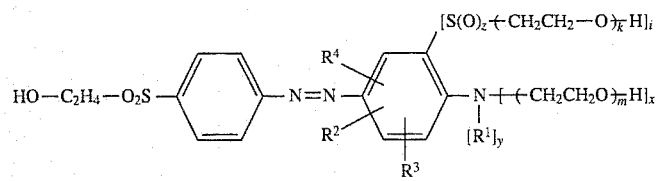

in which $R^1$ represents hydrogen, methyl, ethyl, benzyl or 2-cyanoethyl and $R^2$, $R^3$ and $R^4$ independently of one another represent hydrogen, methyl, ethyl, methoxy, acetylamino or chlorine and k denotes a number from 1 to 4, preferably from 1 to 2, m denotes a number from 1 to 4, preferably from 1 to 2, and i, x, y and z have the abovementioned meanings, are used for colouring polyurethane plastics.

The invention also relates to novel monoazo dyestuffs of the formula

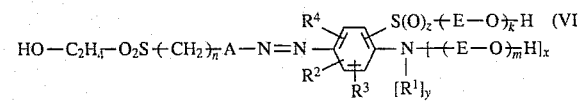

in which

A represents phenylene or naphthylene, each of which is optionally substituted by alkyl or halogen, E represents $C_1-C_4$-alkylene, $R^1$ represents hydrogen or represents a $C_1-C_6$-alkylene radical, which is optionally substituted by —Cl, —CN, amino, alkylamino, dialkylamino, $C_1-C_4$-alkoxycarbonyl, aminocarbonyl and/or phenyl, $R^2$, $R^3$ and $R^4$ independently of one another represent hydrogen, halogen, hydroxyl, amino, acylamino or $C_1-C_6$-alkyl, or $C_1-C_6$-alkoxy, mono-or di-$C_1-C_6$-alkylamino, $C_1-C_6$-alkylthio, $C_1-C_6$-alkylsulphoxide or $C_1-C_6$-alkylsulphonyl, each of which is optionally substituted by hydroxyl or $C_1-C_4$-alkylene oxide units, or two of these radicals complete a fused benzene ring, which is optionally substituted, m represents a number from 1 to 4, n represents a number from 0 to 2, x represents 1 or 2, and y represents 0 or 1, z represents 0, 1 or 2, k represents a number from 1 to 4, the sum of x and y being 2.

Preferred embodiments are dyestuffs of the formula

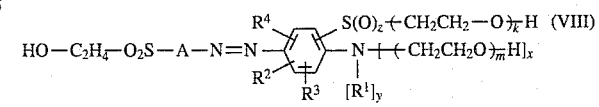

in which

A represents 1,2-, 1,3- or 1,4-phenylene or 2,6 -naphthylene, each of which is optionally substituted by methyl, ethyl, chlorine or bromine, $R^1$ represents hydrogen or represents a $C_1-C_6$-alkylene radical which is optionally substituted by —Cl, —CN, amino, alkylamino, dialkylamino, $C_1-C_4$-alkoxycarbonyl, aminocarbonyl and/or phenyl, $R^2$, $R^3$ and $R^4$ independently of one another represent hydrogen, methyl, ethyl, n-propyl, isopropyl, chlorine, acylamino or methoxy, k represents a number from 1 to 4, z represents a number from 0 to 2, m represents a number from 1 to 4, x represents 1 or 2 and y represents 0 or 1.

A particularly preferred embodiment comprises dyestuffs according to the invention of the formula

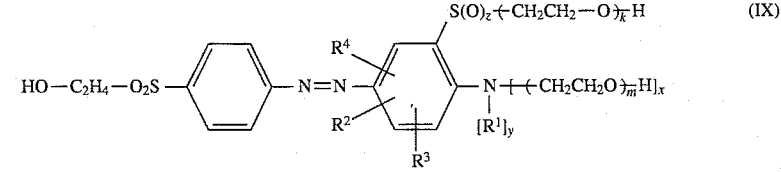

in which $R^1$ represents hydrogen, methyl, ethyl, benzyl or 2-cyanoethyl and $R^2$, $R^3$ and $R^4$ independently of one another represent hydrogen, methyl, ethyl, methoxy, acetylamino or chlorine and k represents a number from 1 to 4, preferably from 1 to 2, z represents a number from 0 to 2, m represents a number from 1 to 4, preferably from 1 to 2, x represents 1 or 2 and y represents 0 or 1.

The dyestuffs can be prepared, for example, by coupling diazotised amines of the formula $$HO-C_2H_4-O_2S-(CH_2)_n-A-NH_2 \quad (V)$$

in which A and n have the abovementioned meanings, with coupling components of the formula

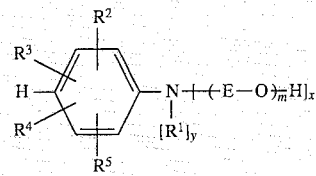

in which E, $R^1$, $R^2$, $R^3$, $R^4$, $R^5$, m, x and y have the above-mentioned meanings, in accordance with processes customary per se, as described, for example, in U.S. Pat. No. 4,271,072.

Coupling components of the formula V can also be in the form of mixtures with randomly distributed alkylene oxide units, such as are obtained, for example, on reaction of primary or secondary aromatic amines with alkylene oxides.

Dyestuffs of the formula III or IV in which i is 1 and z is 1 or 2 and dyestuffs of the formulae VII, VIII and IX in which, z is 1 or 2 can be prepared by oxidation of dyestuffs of the formula III or IV in which i is 1 and z is 0 or, respectively, or dyestuffs of the formulae VII, VIII and IX in which z is 0, using oxidising agents such as, for example, hydrogen peroxide, peracetic acid and the like, if appropriate in the presence of oxidation catalysts (for example tungsten(VI) oxide, sodium tungstate and the like) at temperatures of 0°–100° C. If the oxidation is carried out in water as the solvent, the reaction can be carried out at pH values of 0–10, preferably at pH 2 to 10, if appropriate with the addition of a buffer system such as, for example, acetic acid/sodium acetate.

The process according to the invention for colouring polyurethane plastics is generally carried out by adding the dyestuff of the formula (I) in a suitable form either to the polyol component or the polyisocyanate component or to the reaction mixture, before or during polyurethane formation. The subsequent reaction is carried out in the conventional manner, i.e. in the same way as for uncoloured polyurethane plastics. Data on this are to be found, for example, in G. Oertel, Kunststoff-Handbuch (Plastics Handbook), volume 7, Polyurethane (Polyurethanes), Hanser, Munich, Vienna 1983; English edition 1985.

The dyestuffs can be added in bulk in the form of dyestuff powder or granules, but more appropriately in the form of a solution or dispersion in a suitable solvent or dispersing medium, both the individual dyestuffs and dyestuff mixtures being suitable.

The polyurethane plastics coloured by the process according to the invention can be used for very diverse applications, for example as compression mouldings, films, fibres, foams, paints and coating materials.

In addition to the characteristic urethane groupings in the macromolecule, the polyurethanes can also contain yet further functional groups, such as amide, urea or carbodiimide groups.

Solutions or dispersions in high-boiling organic liquids, for example aliphatic or aromatic esters of phosphoric acid, phosphonic acid, phthalic acid or adipic acid, such as diphenyl isopropyl phosphate, diphenyl cresyl phosphate, diphenyl octyl phosphate, trichloroethyl phosphate and tributyl phosphate or dioctyl phthalate, butyl benzyl phthalate and dibutyl phthalate or dioctyl adipate and octyl benzyl adipate, lactones, for example butyrolactone, alcohols, in particular liquid polyalcohols, for example octaethylene glycol and condensation products of adipic acid and 1,3-butanediol or 1,2-propanediol, ketones or ethers, having boiling points above 180° C. and vapour pressures below 1 mbar at 20° C., have proved suitable for the preparation of foams. The polyurethane foams coloured in this way can be not only flexible, semi-rigid or rigid foams but also polyurethane integral foams.

The polyurethane thermoplastics coloured by the process according to the invention, which are used to produce mouldings by injection moulding, extrusion or calendering, are preferably obtained by adding the dyestuff, dissolved or dispersed in a polyol or a diol used as a chain extender, to the reaction mixture or to one of the components, preferably the polyol compound.

Suitable polyols are both hydroxyl group-containing polyesters, in particular reaction products of dihydric alcohols with dibasic carboxylic acids, and hydroxyl group-containing polyethers, in particular addition products of ethylene oxide, propylene oxide, styrene oxide or epichlorohydrin with water, alcohols or amines, preferably dialcohols.

Chain-extending diols are, for example, ethylene glycol, diethylene glycol, butanediol, hexanediol, octanediol and hydroquinone-β-dihydroxyethyl ether.

If monoalcohols or monoamines are also used to prepare the thermoplastic polyurethane, the dyestuff can be dissolved or dispersed in these reagents also. Suitable monoalcohols are, for example, hexanol, octanol, nonyl alcohol or isooctanol.

The polyurethane systems coloured by the process according to the invention with the dyestuffs of the formula (I) are also suitable for textile coating. The coloured polyurethanes can be used in the form of powders, solutions, granules or dispersions. Chemical and applications details can be taken from the specialist literature, for example Melliand Textilberichte 53, 1272 to 1277 (1972); 52, 1094 to 1099 (1971); 51, 1313 to 1317 (1970).

In the case of coating powders, the dyestuff to be used in the process according to the invention is most expediently dispersed in the polyol component before a prepolymer is prepared by reaction with a diisocyanate, which prepolymer is reacted in the final stage with a diamine, with chain extension, to give a coloured, free-flowing, thermoplastic polyurethane powder.

In the case of the solutions of the one-component polyurethane coating compositions and in the case of the aqueous dispersions, the dyestuff is most simply added to the polyol component during the preparation of the polyurethane and incorporated in the polyurethane molecule during the reaction with the diisocyanate. In the case of two-component polyurethane textile-coating compositions, the dyestuff can either be incorporated in the crosslinkable polyurethane or can be admixed in the form of a paste, dispersed in a suitable medium, for example a solution of a polyester-polyurethane in methylethyl glycol/toluene, to the crosslinkable polyurethane, the incorporation of the dyestuff being completed in the final reaction step during the reaction with a diisocyanate.

Polyurethane elastomers, from which elastomer filaments can be prepared by conventional processes, can be coloured using dyestuffs of the formula (II).

To this end the dyestuff is finely dispersed in the dihydroxy component before a NCO group-containing prepolymer, in which the dyestuff is chemically incorporated, is prepared by reaction with a diisocyanate.

A polyurethane elastomer solution is obtained in solution from the prepolymer by reaction with a diamine serving as chain extender and can be processed by the dry or wet spinning process to give filaments, or, by spreading the elastomer solution on glass plates and drying, for example for 30 minutes at 70° C. and 45 minutes at 100° C., to give films.

Details on the preparation of polyurethane elastomer solutions can be taken, for example, from German Offenlegungsschrift DE-A-1,962,602.

The process for colouring polyurethane paints using dyestuffs of the formula (I) is expediently carried out by dissolving the dyestuff in the solution which contains the polyisocyanate component and polyol component. The coloured paint is then applied to the surface to be painted and stoved, for example for 30 minutes at 180° C., the dyestuff being incorporated in a manner which is very fast to overpainting and bleeding.

The dyestuffs are expediently used in a concentration of 0.005 to 1.0% by weight, preferably 0.05 to 0.5% by weight, with respect to the polyol component, in all applications.

Yellow- to red-coloured polyurethane plastics for very diverse fields of application which are distinguished by a very good fastness level are obtained by the process according to the invention.

Compared with the dyestuffs described in GB-A-1,472,379 and U.S. Pat. No. 4,751,254, the dyestuffs according to the invention have a distinctly improved incorporation capacity coupled with outstanding thermal stability and photostability.

The preparation and use will be illustrated by means of the following examples, wherein unless otherwise stated, the percentages denote percentages by weight and parts denote parts by weight.

PREPARATION OF INTERMEDIATES

EXAMPLE 1

An emulsion of 135 g of benzothiazole and 1 g of a conventional emulsifier in 500 ml of water is heated to 60° C. and nitrogen is passed through for 1 hour. Over a period of approx. 12 hours, a total of approx. 300 g of ethylene oxide are then metered in so as to maintain a pH of between 9.5 and 10.5. The reaction is followed by thin layer chromatography. As soon as less than 1% of the initial concentration of the benzothiazole is detectable, the introduction of ethylene oxide is stopped and the reaction solution is heated at 80° C. for a further 2 hours with the passage of a vigorous stream of nitrogen. After the residual ethylene oxide has been removed in this way, the approx. 800 ml of reaction solution are cooled to room temperature. In addition to glycol and small amounts of polyglycols, the reaction solution contains the relatively pure hydroxyethylaniline derivative of the formula

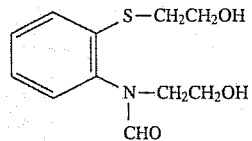

and can be directly reacted further.

To characterise the product, an 80 ml sample of the solution at pH 7 is worked up by extraction and distillation to give a viscous colourless oil, to which the above structure can be assigned on the basis of the $^1$H NMR and IR data.

IR (NuJol mull): 1662 cm$^{-1}$ (CO vib.)

$^1$H NMR (d$_6$-DMSO): δ=3.05 (2H, m); 3.48 (2H, m); 3.60 (2H, m); 3.65 (2H, m); 4.68 (t, OH); 4.94 (t, OH); 7.15–7.50 (m, 4H); 8.00 (s, CHO).

Mass spectrum: m/e=241 (M$^+$,45%); 213 (M$^+$-CO, 45%); 182 (65% ); 164 (55% ); 136 (100% ).

EXAMPLE 2

200 ml of 70% sulphuric acid are added to 800 ml of the reaction solution of Example 1 and the mixture is heated at 90°–95° C. for one hour. It is then cooled, neutralised with concentrated sodium hydroxide solution, with external cooling, and then adjusted to pH 12.5, a colourless oil separating out.

(However, the reaction solution of Example 1 can also be hydrolysed under alkaline conditions by adjusting the pH to 12.5–13.0 with sodium hydroxide solution and heating at 80°–85° C. for 30 minutes.)

The oil is separated of# and characterised as the hydroxyethylaniline of the formula

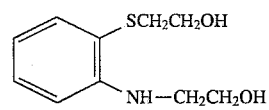

$^1$H NMR (d$_6$-DMSO): δ=2.77 (t, 2H); 3.18 (m, 2H); 3.42 (m, 2H); 3.60 (m, 2H); 4.81 (t, OH); 4.83 (t, OH); 5.46 (t, NH); 6.50–6.63 (m, 2H); 7.15 (m, 1H); 7.30 (m, 1H).

EXAMPLE 3

137 g of 2-(N-methylamino)thiophenol are dissolved in 200 ml of water by adding 120 ml of 40% sodium hydroxide solution. The resulting solution is heated to 90° C. After the reaction space has been freed from oxygen by the passage of nitrogen, 50 g of ethylene oxide are introduced over a period of approx. 2–3 hours. The mixture is subsequently stirred for a further 30 minutes at 90°–95° C. under a stream of N$_2$ and then cooled to 40° C. The 2-hydroxyethyl 2-N-methylaminophenyl sulphide of the structure

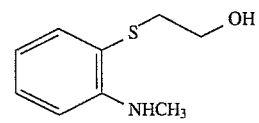

which has separated out as an oil, is separated from the aqueous phase and can be used directly in this form as a coupling component.

EXAMPLE 4

23.6 g of monosodium 7-amino-1,3-naphthalenedisulphonate are stirred in 150 ml of water/50 g of ice and 20 ml of concentrated hydrochloric acid, and 17 ml of a sodium nitrite solution (300 g/l) are added dropwise at 5° to 10° C. The diazotisation is complete after 1.5 hours. The small excess of nitrite is destroyed by adding amidosulphonic acid. The cream-coloured suspension is adjusted to pH 2.5 with sodium carbonate solution. A solution of 15.0 g of the free base of Example 2 in 100 ml of water, adjusted to pH 2.0, is added dropwise at approx. 10° C. The mixture is stirred for 4 to 5 hours at 10° C. (pH 1.5–2.0). To bring the coupling reaction to completion, the pH is raised to 4.5 by adding sodium acetate and the mixture is stirred for a further 2 hours. 40 g of sodium chloride are added, the mixture is stirred for 1 hour and the precipitate is isolated by suction filtration. 48 g of a salt-containing dye of the formula

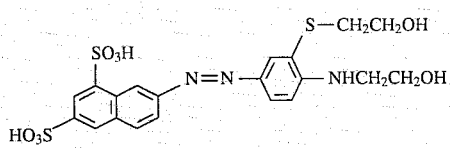

are obtained after drying.

λmax=454 nm (H$_2$O, pH 7-8)

$^1$H NMR (d$_6$-DMSO): δ=2.88 (t, 2H); 3.35 (t, 2H); 3.50 (t, 2H); 3.65 (m, 2H); 5.15 (broad s, 2OH); 6.17 (t, NH); 6.85 (d, 1H); 7.83–8.07 (m, 4H); 8.16 (s, 1H); 8.30 (s, 1H); 9.30 (s, 1H).

EXAMPLE 5

7 g of the dye of Example 4 are stirred in 250 ml of water at pH 8–8.5, 0.2 g of sodium tungstate is added and the mixture is heated to 70° C. 30 ml of an approx. 35% aqueous hydrogen peroxide solution are added dropwise. The temperature should be between 70° and 80° C. during this process. After approx. 2 hours, the oxidation is checked by thin layer chromatography. The sulphoxide derivative formed as an intermediate during the oxidation can also be detected. If appropriate, a further 10 to 15 ml of hydrogen peroxide solution are added in order to oxidise the residual sulphoxide derivative to the sulphone derivative. The mixture is then stirred for 2 hours at 80° C., cooled to room temperature and acidified to pH 0.5 to 1.0 with dilute sulphuric acid. The dye is salted out with 35 g of sodium chloride and 5 g of potassium chloride and isolated. 38 g of a salt-containing dye of the formula

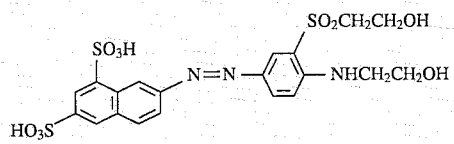

are obtained after drying. TLC and NMR show that the proportion of azoxy is only a few percent.

νmax=406 nm (H$_2$O, pH 7–8)

$^1$H NMR (d$_6$-DMSO): δ=3.42 (t, 2H); 3.55 (t, 2H); 3.68 (t, 2H); 3.75 (t, 2H); 5.0–5.3 (broad, 2OH); 6.9 (broad s, NH); 7.13 (d, 1H); 7.98 (dd, 1H); 8.05–8.17 (m, 2H); 8.20 (s, 1H); 8.27 (d, 1H); 8.32 (d, 1H); 9.35 (d, 1H).

If the diazo component in Example 4 is now varied, other valuable dyes of azosulphide and azo/azoxysulphone structures can be prepared analogously to the coupling instructions (Example 4) and oxidation instructions (Example 5):

| Ex. | D | λmax (H$_2$O, pH 7–8) | Ex. | λmax (H$_2$O, pH 7–8) |
|---|---|---|---|---|
| 6 | HO$_2$C—⟨phenyl⟩— | 432 nm | 11 | 396 nm |
| 7 | ⟨phenyl with o-CO$_2$H⟩— | 406 nm | 12 | 374 nm |
| 8 | ⟨phenyl with o-SO$_3$H⟩— | 414 nm | 13 | 397 nm |
| 9 | HO$_3$S—⟨naphthyl⟩— | 448 nm | 14 | 402, 455 (sh) nm |
| 10a | HO$_3$S—OCH$_2$CH$_2$—SO$_2$—⟨phenyl⟩— | 446 nm | 15a | 404 nm |
| 10b | HO—CH$_2$CH$_2$—SO$_2$—⟨phenyl⟩— | 448 nm | 15b | 404 nm |

EXAMPLE 16

12.5 g of 4-aminobenzenesulphonic acid are diazotised analogously to Example 4 and the resulting suspension is adjusted to pH 2.5 with sodium carbonate solution. A solution of 15.0 g of the free base of Example 2 in 100 ml of water, adjusted to pH 2.0, is added dropwise at 5° to 10° C. The mixture is stirred for 5 hours at pH 1.5 to 2.5 and at 10° C. and then for 3 hours at pH 3.5 to 4.0 and at 10° C., the pH being raised with sodium acetate solution. When coupling is complete, the pH is adjusted to 8.0 with sodium carbonate solution. A clear solution of the azo dye of the formula

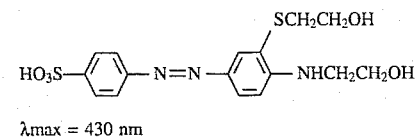

$\lambda$max = 430 nm is obtained.

0.2 g of sodium tungstate is added to the solution and the mixture is heated to 60° C. 35 ml of a 35% aqueous hydrogen peroxide solution are metered in over a period of 15 minutes and the reaction is maintained at 70° to 80° C. Oxidation to the sulphone is complete after approx. 3 to 4 hours. The mixture is cooled to 20° C., adjusted to pH 6.0 and salted out with 45 g of sodium chloride. After stirring for a further 2 hours, the precipitate is filtered off with suction and dried to give 32 g of a golden yellow dye powder of the structure

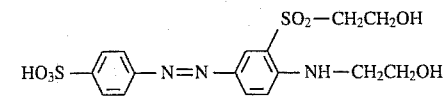

$\lambda$max=396 nm ($H_2O$, pH 7–8)
$^1$H NMR ($d_6$-DMSO): $\delta$=3.38 (t, 2H); 3.50 (t, 2H); 3.60–3.75 (m, 4H); 5.0 (broad s, 20H); 6.94 (t, NH); 7.08 (d, 1H); 7.78 (m, 4H); 8.05 (dd, 1H); 8.17 (d, 1H).

COMPOUNDS ACCORDING TO THE INVENTION

EXAMPLE 17

35 g of the dye of Example 5 are added in portions to 50 ml of sulphuric acid monohydrate at 15°–25° C., with stirring, and the mixture is stirred for 2 hours at 20°–25° C. The red solution is then discharged on to 150 g of ice and 50 ml of water and the product is salted out with 20 g of sodium chloride and isolated by suction filtration. The moist dye paste is stirred in 150 ml of water and the mixture is neutralised with solid sodium bicarbonate. After suction filtration and drying, 45 g of a salt-containing reddish brown reactive dye powder are obtained which dyes cotton in golden yellow shades and to which the structure

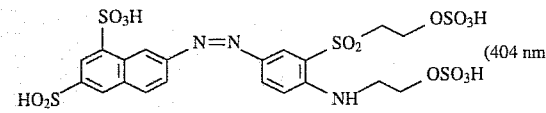

(404 nm)

is assigned.

The dyes of Examples 11 to 15 can also be sulphated analogously to Example 17, giving yellow reactive dyes such as

EXAMPLE 18

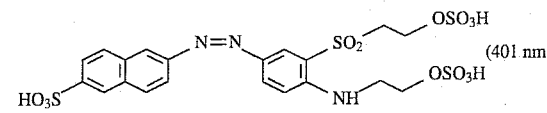

(401 nm)

EXAMPLE 19

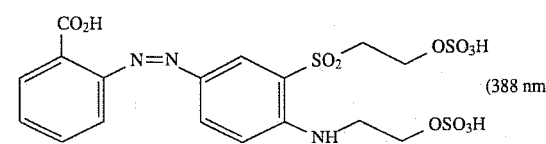

(388 nm)

EXAMPLE 20

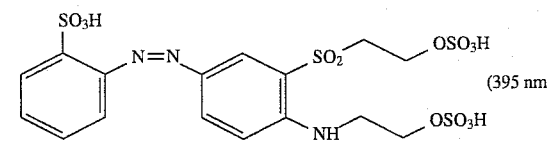

(395 nm)

EXAMPLE 21

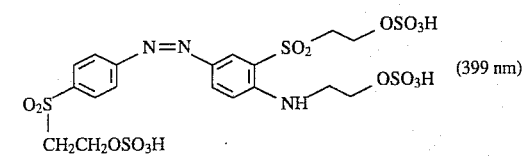

(399 nm)

This bifunctional reactive dye of Example 21 results from the sulphation of both the dye of Example 15a and that of Example 15b.

The same reactive dye 21 is also obtained if the dye of Example 10a or 10b is added to sulphuric acid monohydrate, the requisite amount of potassium peroxodisulphate is added at 20° C., the mixture is stirred for 2 hours at 40° C. and the product is worked up and isolated as described (see Example 17).

A similarly important and valuable bifunctional reactive dye, which can be prepared analogously, is

EXAMPLE 22

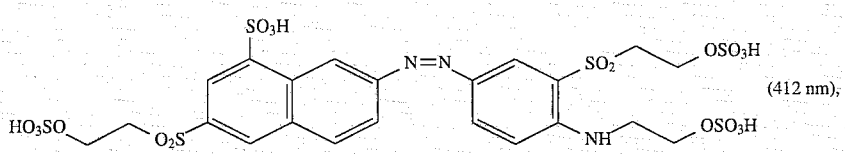

(412 nm), whose monofunctional intermediate of the structure

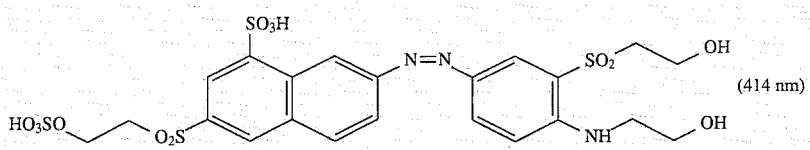

(414 nm)

already dyes cotton in golden yellow shades of high fastness.

If the coupling component (Example 2) of the previous Examples is replaced with 2-aminophenyl 2-hydroxyethyl sulphide (cf. European patent 137 417) or with 2-N-methylaminophenyl 2-hydroxyethyl sulphide (Example 3) and the azo dyes obtainable therefrom are oxidised and sulphated analogously to the instructions in Examples 5, 16 and 17, the following valuable yellow to golden yellow reactive dyes are obtained:

EXAMPLE 23

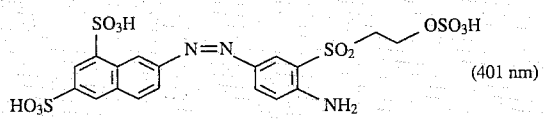

(401 nm)

EXAMPLE 24

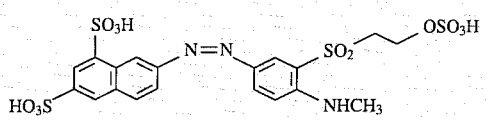

EXAMPLE 25

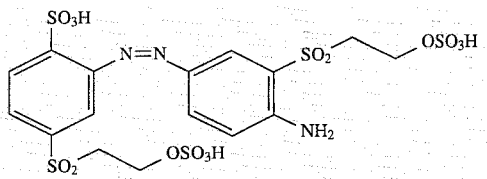

EXAMPLE 26

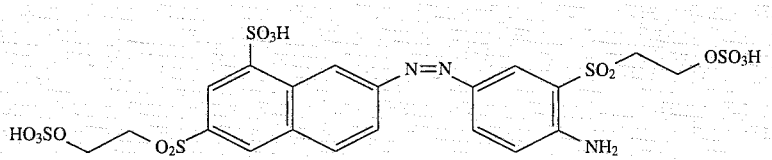

EXAMPLE 27

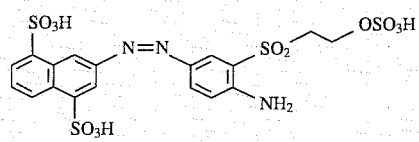

EXAMPLE 28

4'-Amino-azobenzene-4-sulphonic acid is diazotised in known manner and coupled with the component of Example 2 at pH 3–5. This solution of the disazo dye of the structure

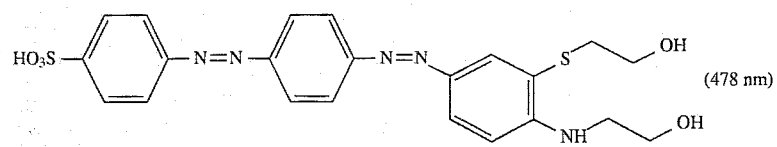

(478 nm)

is oxidised with hydrogen peroxide solution in the presence of a catalytic amount of sodium tungstate, as described in Example 5. The sulphone of the structure

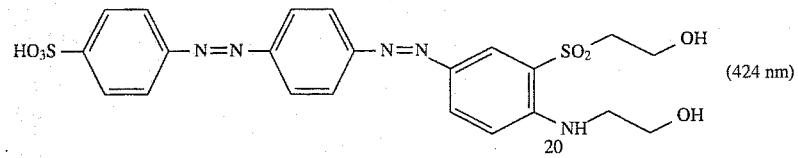

(424 nm)

is isolated by salting-out and dried. Double sulphation analogously to Example 17 yields a disazo reactive dye which dyes cotton or wool in brilliant orange shades with a high level of fastness and to which the following structure is assigned:

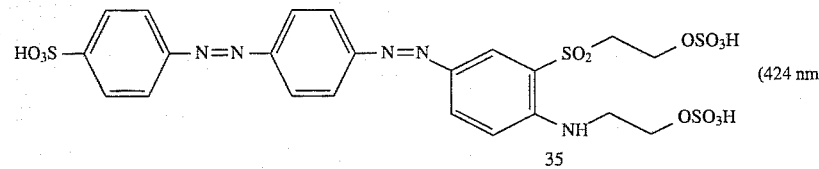

(424 nm)

By varying the diazo component or using 2-aminophenyl 2-hydroxyethyl sulphide, other valuable orange or reddish brown disazo reactive dyes of the structure

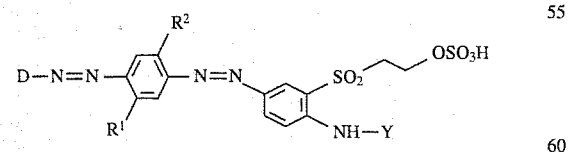

can be obtained (see Table). Fibre-reactive aminoazo compounds used as diazo components are described e.g. in European patent document A-292 825.

| Ex. | D | R¹ | R² | Y |
|---|---|---|---|---|
| 29 | phenyl-3-SO₃H | H | H | CH₂CH₂OSO₃H |
| 30 | phenyl-2-SO₃H | H | H | CH₂CH₂OSO₃H |
| 31 | phenyl-2,5-(SO₃H substituted) | H | SO₃H | " |
| 32 | " | CH₃ | " | " |
| 33 | phenyl-2,5-di-SO₃H | CH₃ | H | CH₂CH₂OSO₃H |
| 34 | " | H | H | H |
| 35 | phenyl-4-SO₃H | H | SO₃H | H |
| 36 | " | CH₃ | H | CH₂CH₂OSO₃H |
| 37 | " | OCH₃ | H | " |
| 38 | " | OCH₃ | OCH₃ | " |
| 39 | phenyl-3-SO₃H | H | OCH₃ | " |
| 40 | phenyl-3-SO₃H | CH₃ | OCH₃ | CH₂CH₂OSO₃H |
| 41 | phenyl-4-SO₃H | Cl | H | " |
| 42 | " | CH₂SO₂CH₂CH₂OSO₃H | H | " |
| 43 | " | NHCOCH₃ | H | " |
| 44 | " | NHCOCH₃ | OCH₃ | " |
| 45 | " | NHCONH₂ | H | " |
| 46 | naphthyl-1,3-di-SO₃H | CH₃ | H | CH₂CH₂OSO₃H |
| 47 | naphthyl-1,3,6-tri-SO₃H | H | H | H |

-continued

| Ex. | D | R¹ | R² | Y |
|---|---|---|---|---|
| 48 | 1-SO₃H, 3-SO₃H, 7-methyl naphthalene | NHCOCH₃ | H | CH₂CH₂OSO₃H |
| 49 | 1-SO₃H, 3-SO₃H, 7-methyl naphthalene | NHCOCH₃ | OCH₃ | CH₂CH₂OSO₃H |
| 50 | 4-(SO₂CH₂CH₂OSO₃H)-methylphenyl | CH₃ | SO₃H | " |
| 51 | 4-(SO₂CH₂CH₂OSO₃H)-methylphenyl | NHCOCH₃ | SO₃H | " |
| 52 | 3-(SO₂CH₂CH₂OSO₃H)phenyl | H | SO₃H | " |
| 53 | 4-(CH₂SO₂CH₂CH₂OSO₃H)-methylphenyl | CH₃ | SO₃H | " |
| 54 | 3-SO₃H, 1-(SO₂CH₂CH₂OSO₃H) phenyl | CH₃ | SO₃H | " |
| 55 | " | H | SO₃H | " |
| 56 | 1-SO₃H, 3-SO₃H, 7-methyl naphthalene | H | SO₂CH₂CH₂OSO₃H | CH₂CH₂OSO₃H |
| 57 | 1-SO₃H, 4-SO₃H, 7-methyl naphthalene | H | " | " |

-continued

| Ex. | D | R$^1$ | R$^2$ | Y |
|---|---|---|---|---|
| 58 | | H | " | " |
| 59 | | H | " | " |
| 60 | " | NHCONH$_2$ | H | " |

Compound 56 can be prepared by diazotising the dye of Example 23 or its non-sulphated precursor, coupling the diazotised product with the component of Example 2 and oxidising and sulphating the coupled product.

Alternatively, the thio precursor of the structure

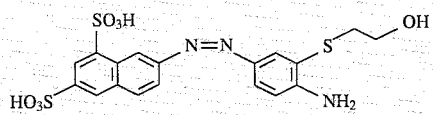

is diazotised, the diazotised product is coupled with the compound according to Example 2 and both hydroxyethylmercapto radicals of the disazo dye are oxidised and sulphated. The above thio precursor is also obtained by coupling with 2-(N-sulphomethyl)aminophenyl 2-hydroxyethyl sulphide and then saponifying the ω-methanoic acid group under alkaline conditions.

By varying the middle component, it is possible to obtain other valuable disazo reactive components such as e.g.

EXAMPLE 61

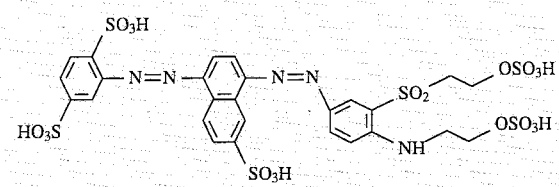

EXAMPLE 62

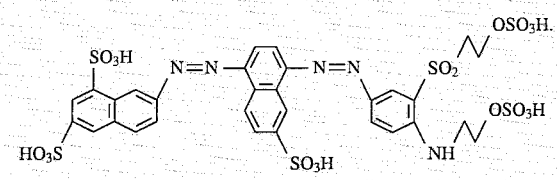

EXAMPLE 63

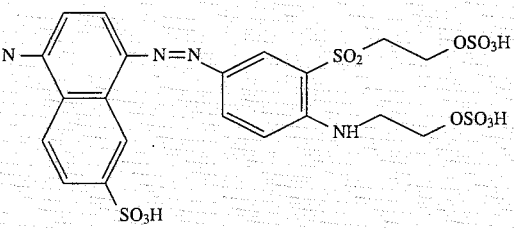

EXAMPLE 64

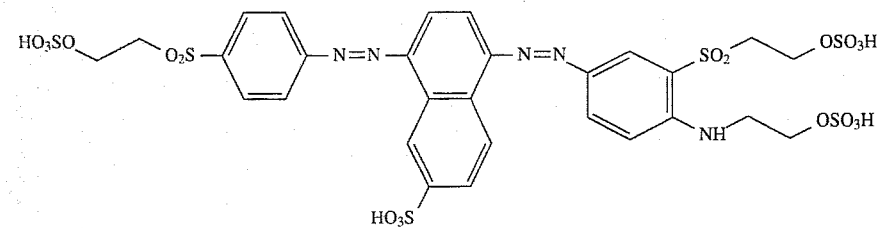

EXAMPLE 65

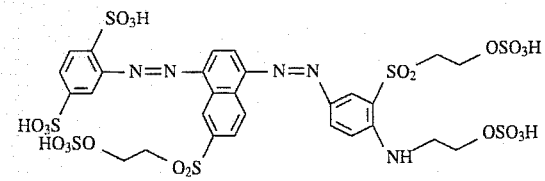

is salted out, isolated by suction filtration and dried.

It dyes cotton in reddish yellow shades. Other valuable bifunctional reactive dyes, can be obtained by this process variant.

EXAMPLE 66

The dye base of the structure

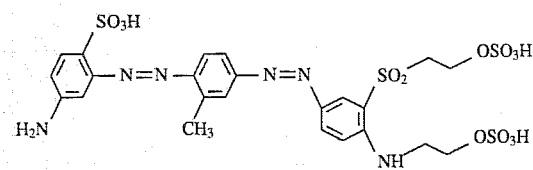

which can be prepared by the diazotisation of 5-acetylamino-2-aminobenzenesulphonic acid, coupling with m-toluidine, diazotisation of the aminoazo compound, coupling with the component of Example 2, oxidation with hydrogen peroxide, saponification of the N-acetyl group and sulphation of the hydroxyethyl groups, is stirred in water at pH 6.5 and reacted with a 1.2-fold molar excess of 5-chloro-2,4,6-trifluoropyrimidine, the pH being kept constant at 6–7 by the addition of sodium carbonate solution. When the reaction is complete, the solid of the structure

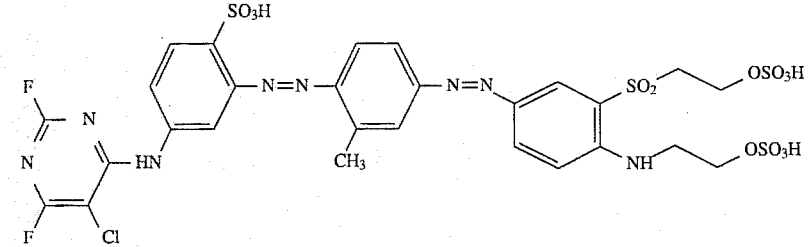

EXAMPLE 67

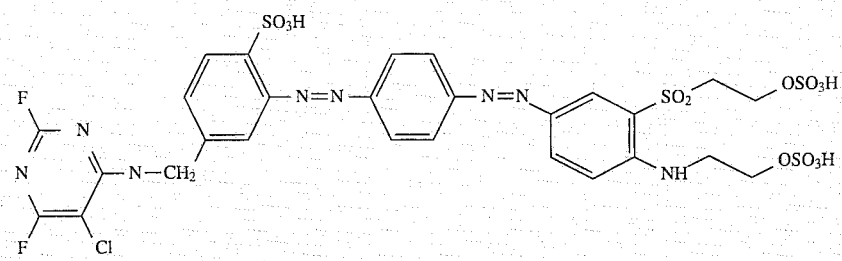

EXAMPLE 68

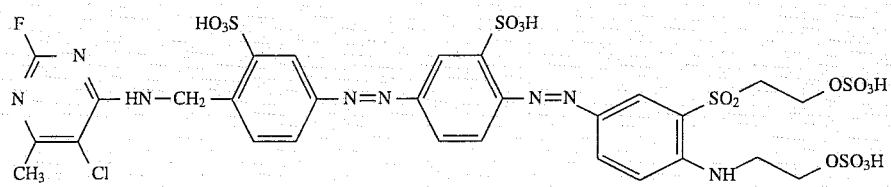

EXAMPLE 69

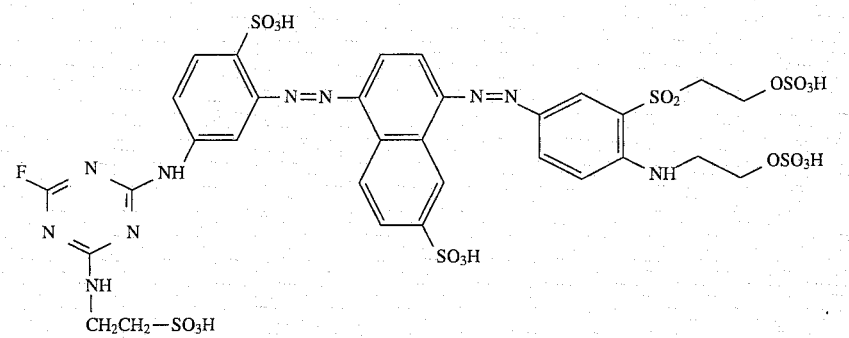

EXAMPLE 70

2-Amino-5-aminomethyl-1-naphthalenesulphonic acid is diazotised in conventional manner and coupled with the coupling component of Example 2 as in Example 3. After oxidation and sulphation of the monoazo compound, the product is condensed with an equimolar amount of 5-chloro-4,6-difluoropyrimidine at pH 7–8. The hydrofluoric acid liberated is continuously neutralized by the addition of sodium carbonate. The dye is salted out, filtered off with suction and dried. It dyes cotton in clear yellow shades and has the structure

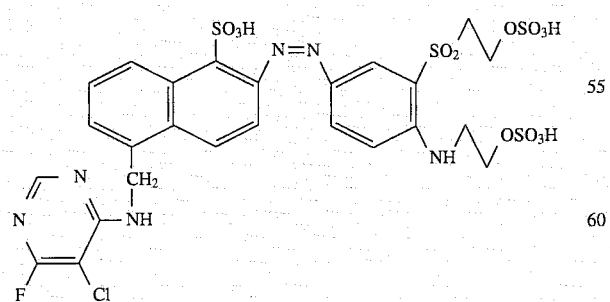

Other important and useful bifunctional dyes which can be prepared in the same way as described in Example 21 are as follows:

| Example | R | Y |
|---|---|---|
| 71 | H | $CH_2CH_2SO_3H$ |
| 72 | H | $CH_2-SO_3H$ |
| 73 | H | $CH_2-CO_2H$ |
| 74 | H | $CH_2CH_2CO_2H$ |
| 75 | H | $CH_2CH_2CH_2CO_2H$ |
| 76 | $CH_2CO_2H$ | $CH_2CO_2H$ |
| 77 | H | $CH(CO_2H)-CH_2CO_2H$ |
| 78 | H | $CH_2$–C$_6$H$_4$–$SO_3H$ |
| 79 | H | $CH_2$–C$_6$H$_4$(m-$SO_3H$) |
| 80 | H | $CH_2CH_2SO_2CH_2CH_2OSO_3H$ |
| 81 | $CH_2CO_2H$ | " |
| 82 | $CH_2CH_2SO_3H$ | " |
| 83 | $CH_3$ | $CH_2CH_2OSO_3H$ |

-continued

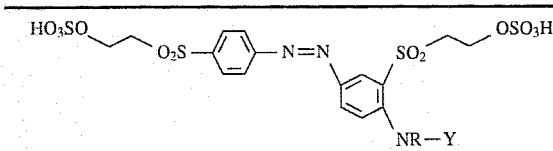

| Example | R | Y |
|---|---|---|
| 84 | CH₂CO₂H | CH₂CH₂OSO₃H |
| 85 | C₂H₅ | CH₂CH₂OSO₃H |
| 86 | CH₂—⌬—SO₃H | CH₂CH₂OSO₃H |
| 87 | CH₂CH₂CO₂H | CH₂CH₂CO₂H |
| 88 | CH₂CH₂CO₂H | CH₂CH₂OSO₃H |

Using the same method as described in Examples 17 and 28 the following important and useful dyes can be prepared by variation of the radicals R and Y in the coupling component.

EXAMPLE 89

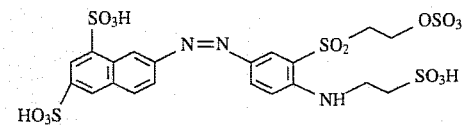

EXAMPLE 90

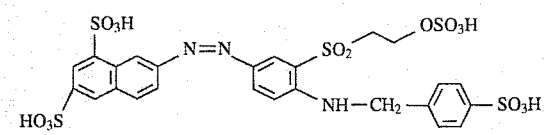

EXAMPLE 91

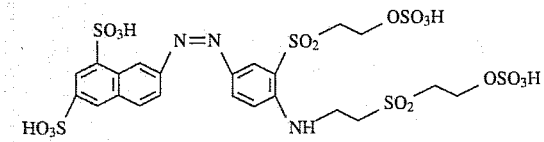

EXAMPLE 92

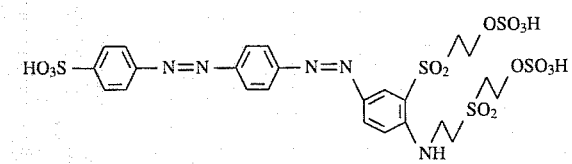

EXAMPLE 93

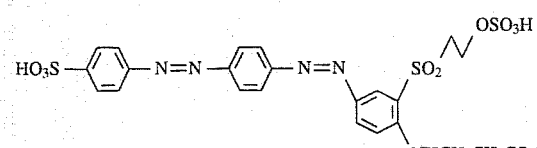

EXAMPLE 94

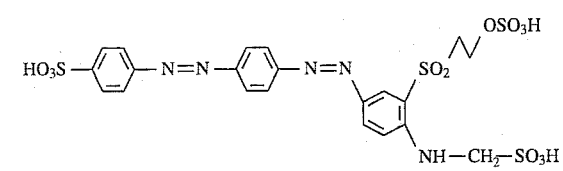

DYEING METHOD 1

2 parts of the dye obtainable according to Example 28 are dissolved in 100 ml of water. The solution is added to 1900 parts of cold water, 60 parts of sodium chloride are added and 100 parts of a woven cotton fabric are put into this dyebath.

The temperature is raised to 60° C., 40 parts of calcined sodium carbonate and a further 60 parts of sodium chloride being added after 30 minutes. The temperature is kept at 60° C. for 30 minutes and the dyeing is then rinsed, soaped for 15 minutes in a boiling 0.3% solution of an ion-free detergent, rinsed and dried to give a golden yellow dyeing with good fastness properties.

DYEING METHOD 2

4 parts of the reactive dye prepared in Example 22 are dissolved in 50 parts of water. 50 parts of a solution containing 5 g of sodium hydroxide and 10 g of calcined sodium carbonate per liter are added. A woven cotton fabric is padded with the resulting solution so that its weight increases by 70%, and it is then wound on to a hatching roller. The cotton fabric is stored in this form for 3 to 12 hours at room temperature. The dyed goods are then rinsed, soaped at the boil for a quarter of an hour with a non-ionic detergent, rinsed again and dried to give a yellow dyeing with good fastness properties.

Deep black dyeings are obtained by using suitable mixtures of the dye of Example 22 with C.I. Reactive Black 5.

EXAMPLE 95 a) A mixture composed of 10.0% of the dyestuff of the formula

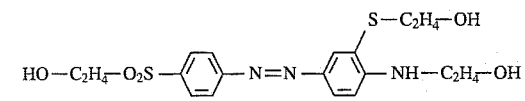

($\lambda_{max}$=440 nm (H₂O))

13.5% of butylbenzyl phthalate and 76.5% of a condensation product of adipic acid and 1,2-propanediol, which has a hydroxyl number of 112 to 113 and an acid number of 0.31, is homogenised by stirring and then ground in a continuously operating commercial stirred ball mill, which contains glass beads 0.3 to 0.4 mm in diameter as grinding medium and the shaft of which, provided with plane circular discs, is rotating at a speed of 100 rpm, until the particle size of the dyestuff is less than 1 to 2 μm.

In order to prepare a reddish-tinged yellow-coloured polyurethane foam, 0.5% by weight of the dyestuff dispersion are fed via a separate metering pump into the mixing chamber of the foaming apparatus according to German Patent Specification 901,471. After intensive mixing of the reactants (the formulations for a polyether foam and a polyester foam are described in the following paragraphs), a uniformly deep yellow-coloured foam of uniform pore width is obtained which is distinguished by very good fastness to light and fastness to bleeding.

b) 100 g of a conventional trifunctional polyether, prepared from trimethylolpropane, propylene oxide and ethylene oxide (OH number 35), 4 g of water, 0.6 g of a polysiloxane/polyalkylene block copolymer as stabiliser, 0.12 g of triethylenediamine as catalyst, 0.16 g of tin octoate and toluylene diisocyanate in an amount which is stoichiometric with respect to the amount of polyether and water used, are used to prepare a polyether foam.

c) The following components are used to prepare a polyester foam:

100 g of a polyester, prepared from adipic acid and diethylene glycol (OH number 50), 4 g of water, 1.4 g of N-methylmorpholine as catalyst, 0.5 g of an emulsifier, which comprises an adduct of ethylene oxide with a mixture of higher alcohols and has an average molecular weight of 1100 and an OH number of 52, 3.8 g of a sulphonated caster oil, 0.2 g of paraffin oil and toluylene diisocyanate in an amount which is stoichiometric with respect to the amount of polyester and water used.

EXAMPLE 96

Dyestuff dispersions in which the adipic acid/propylene glycol adduct is replaced by an adipic acid/propylene glycol adduct having a OH number of 110 to 111 and an acid number of 0.2 or by a condensation product of adipic acid and 1,3-butanediol having an OH number of 114 and an acid number of 0.36 are prepared as in Example 95.

Reddish-tinged yellow ether and ester foams which have outstanding fastness properties are obtained with these dyestuff dispersions also.

EXAMPLE 97 a) A yellow dyestuff paste composed of 20 g of the dyestuff mentioned in Example 95 and 80 g of a polyether, which is obtained by reaction of 1 mol of trimethylolpropane and 3 mol of ethylene oxide and has an OH number of 550, is prepared as follows:

The dyestuff is kneaded in a dispersion kneader with an amount of the abovementioned polyether such that a viscous, kneadable mass is obtained (approximately 0.4 g of polyether per 1 g of dyestuff is used for this purpose). After a kneading time of 10 minutes, the composition is diluted very slowly with the remaining amount of polyether, with constant kneading. A dyestuff paste is obtained which is used for colouring rigid polyurethane integral foam.

b) 100 g of a polyol mixture which has OH number 495 and a viscosity of 1150 mPa.s at 25° C., composed of 80 g of a polyether having OH number 550, which has been obtained by an addition reaction of ethylene oxide with trimethylolpropane, and 20 g of a polyester which has OH number 370 and has been obtained by reaction of 1 mol of adipic acid, 2.6 mol of phthalic anhydride, 1.3 mol of oleic acid and 6.9 mol of trimethylolpropane, are mixed with 1 g of a polysiloxane/polyalkylene oxide block copolymer as foam stabiliser, 0.5 g of tetramethylguanidine as catalyst, 5 g of monofluorotrichloromethane as propellant and 5 g of the dyestuff preparation described above. The mixture is fed to a two-component metering mixing unit, in which, in order to prepare the foaming reaction mixture, it is mixed intensively with 155 g of a polyisocyanate, which has been obtained by phosgenation of aniline/formaldehyde condensation products and subsequent reaction with a diol having OH number 480, and has viscosity of 130 mPa.s at 25° C. and an NCO content of 28% by weight, and immediately introduced into a metal mould which is temperature-controlled at 60° C. After a mould-release time of 7 minutes, the yellow-coloured moulding of rigid polyurethane integral foam having a bulk density of 0.6 g/cm$^3$ can be released from the mould. The mechanical properties (modulus of elasticity, flexural strength, elongation at break, impact strength, heat distortion resistance and the like) of the coloured moulding are not impaired compared with those of a moulded blank which has not been coloured.

EXAMPLE 98

100 g of an ethanediol/butanediol/adipic acid polyester which has a molecular weight of 2000 (OH number 56) are stirred with a paste composed of 0.1 g of the dyestuff described in Example 95 and 22 g of 1,4-butanediol and 1.2 g of n-octanol (0.037 mol, with respect to 1,4-butanediol). 0.3 g of stearylamide and 1 g of stabiliser (2,6,2',6'-tetraisopropyldiphenylcarbodiimide) are also added and the mixture is heated to 90° C. with stirring, and mixed with equivalent amounts of 4,4'-diphenylmethane diisocyanate (74.6 g with respect to total OH) at 60° C. with vigorous stirring. The mixture is then cast onto a metal sheet and the solidified product is granulated and injection moulded.

A reddish-tinged yellow-coloured polyurethane elastomer moulding is obtained.

EXAMPLE 99 a) 482.5 g of hexanediol polycarbonate which has a molecular weight of 1050 are dehydrated at 125° C. and 14 mmHg, 3.4 g of the dyestuff described in Example 95 are added at 120° C. and the mixture is stirred for 10 minutes and allowed to cool to 100° C., 76.0 g of 1,6-diisocyanatohexane are added and the mixture is held at 100° C. for one hour.

It is then cooled to 60° C., 4.0 g of N-methyldiethanolamine and 169.5 g of acetone are allowed to run in and the mixture is held at 60° C. for 3 hours.

After further cooling to 50° C., 3.1 ml of dimethyl sulphate in 400 g of acetone are added and the mixture is stirred for a further 20 minutes.

737 g of a 50% strength prepolymer solution in acetone which has an NCO content of 1.1% are obtained. 743 g of prepolymer are mixed with 165 g of 1N propylenediamine solution in water and 578 g of distilled water at 45° C. while stirring well The acetone is distilled off and the residue is washed with water, soaked through a 0.5 mm sieve, filtered off with suction and dried.

A reddish-tinged yellow, very free-flowing thermoplastic polyurethane powder which has a melting point of 135° C. is obtained and is used for textile coatings.

b) The powder described above (spherical particles having an average diameter of 43 μm) is spread, using a doctor blade, on a release paper, the amount applied being 100 g/m$^2$, and then exposed to a temperature of 140° C. in a duct 12 m long at a belt speed of 1.5 m/min. A porous film forms which is viscoelastic, can be separated from the support without difficulty and can be handled without any other means of support.

c) The film produced in accordance with paragraph b) is again coated with the same powder. (amount applied: 60 g/m$^2$) in a second coating operation and is then treated at 170° C. in the duct as described in b). A homogeneous reddish-tinged yellow-coloured film which has a total weight per unit area of 160 g/m$^2$ and has high tensile strength, very good elastic properties and outstanding fastness to light is obtained.

d) The films formed in accordance with paragraphs b) and c) can be bonded in a conventional manner by wet-laminating on one or both sides with any desired support materials, such as cotton weaves, polyester weaves, fleece and the like. Polyurethane solutions, polyurethane dispersions or other adhesives are, for example, suitable for wet-laminating. However, lamination can also be carried out in accordance with the principle of hot-sealing by means of thermoplastic powders.

e) A porous film produced in accordance with paragraph b) is provided with a coating of polyurethane powder from paragraph a) (amount applied 80 g/m$^2$) by doctor blade application and exposed to the effect of a temperature of 145° C. A cotton cheese cloth (80 g/m$^2$) is laminated on under pressure when the powder is in the plastic state. After cooling, the laminate is firmly bonded and withstands buckling more than 1,000,000 in the Bally flexometer.

EXAMPLE 100

800 g of an adipic acid copolyester with 1,6-hexanediol and 2,2-dimethyl-1,3-propanediol in a molar ratio of 65:35 (OH number=65.9), in which 0.8 g of the dyestuff described in Example 95 has been finely dispersed, are reacted for 1 hour at 60° C. and 3 hours at 70° to 80° C. with 15.5 g of N,N-bis-(β-hydroxy-propyl)-methylamine and 786 g of a solution of 260 g of diphenylmethane 4,4-diisocyanate in 650 g of dimethylformamide, which had an NCO content of 9.21% after standing for one hour. The NCO content of the pre-adduct is then 2.37%, with respect to the solid substance.

37.7 g of terephthalic acid -bis-m-aminoanilide are stirred into 600 g of the above NCO pre-adduct solution at 50° C. and after 3 hours the mixture is diluted with 20 g of dimethylformamide. After a further rise in the viscosity, the mixture is diluted in each case with dimethylformamide until, after the addition of a total of 850 g of dimethylformamide, a homogeneous elastomer solution having a viscosity of 64 Pa.s at 20° C. is obtained after about 20 hours. The inherent viscosity of the elastomer substance, measured in hexamethylphosphoramide in 1% strength solution at 25° C., is 1.30 dl/g. 1% of acetic anhydride is added to the solution and the solution is spun by the conventional dry-spinning process, the fibres being wound, prestretched by 0 to 30% during the winding operation, onto spools and heatset in this state for one hour at 130° C. A further fraction of the solution is spun by the wet-spinning process.

WET-SPINNING PROCESS

A 20% strength elastomer solution is spun at a throughput of about 1 ml/min through a spinneret which has 20 holes 0.12 mm in diameter into a hot coagulating bath which is composed of 90% by weight of water and 10% by weight of dimethylformamide, is at 80° to 85° C. and is about 3 m long, and wound at a take-off speed of 5 m/min after passing through a washing section (water/90° C.). The spools are kept in water at 50° C. for 1 hour and then dried.

DRY-SPINNING PROCESS

An elastomer solution, which is preferably 24 to 26% strength, is spun through a spinneret which has 16 holes 0.2 mm in diameter into a 5 m long shaft which is heated to 220° to 250° C. and into which air at about 210° to 280° C. is blown. The filaments are taken off at a speed of about 100 m/min and, following preparation with a talc suspension, with stretching if appropriate, are wound, for example at a speed of 125 to 175 m/min. The filaments can then be subjected to a heat after-treatment on spools or in continuous form. Higher spinning speeds, for example 300 to 400 m/min, can also be chosen, in which case it is possible to dispense with a subsequent stretching process.

Reddish-tinged, yellow, highly elastic filaments are obtained which have very good fastness to light and very good wet strength as well as very good thermal, hydrothermal and mechanical properties.

EXAMPLE 101

35 g of the dyestuff described in Example 95 and 65 g of an 8.5% strength solution of a polyester polyurethane, which has been prepared by reaction of a polyester resin, obtained from hexanediol and adipic acid and having an average molecular weight of 800, with toluylene 1,4-diisocyanate, in methylethyl glycol/toluene 1:1 are ground in a bead mill for 12 hours. The resulting dyestuff paste is suitable for pigmenting all commercially available two-component polyester polyurethane textile coating compositions.

b) 10 g of the yellow dyestuff paste described in paragraph a) are stirred slowly into a solution composed of 30 g of a crosslinkable polyester polyurethane having terminal OH groups and 70 g of ethyl acetate. After a short time (3 to 5 minutes), a stable dispersion is obtained which, after the addition of a polyisocyanate, prepared by reaction of 1 mol of trimethylolpropane with 3 mol of toluylene diisocyanate and a heavy metal salt as accelerator, is suitable for coating textiles by the reversal or direct process. The polyurethane films produced by known processes using this dispersion are uniformly coloured reddish-tinged yellow without specks and are fast to light and solvents.

EXAMPLE 102

0.3% of the dyestuff described in Example 95 with respect to the polyester content, are dissolved in a 35% strength solution of a phenol-capped polyisocyanate containing 12% NCO and a branched polyester having a hydroxyl content of 12% in a weight ratio of 2:1 in equal parts of cresol, xylene and glycol monomethyl ether acetate. The reddish-tinged yellow coloured paint is applied to aluminium foil with the aid of a 10 μm coating roller system and then stoved for 30 minutes at 180° C.

The colour of the paint is retained even after stoving. The dyestuff is incorporated in the cured binder. On overpainting with a white stove enamel, which is stored for 30 minutes at 130° C., no bleeding through of the dyestuff is observed.

EXAMPLES 103 TO 126

In addition to the dyestuff used in the above examples, the dyestuffs in the following table were also used successfully in accordance with Examples 95 to 102 for colouring polyurethane plastics in the indicated hues.

| Ex. | Diazo component | Coupling component | Hue | $\lambda_{max}$ (DMF) |
|---|---|---|---|---|
| 103 | 4-(2-hydroxyethyl-sulfonyl-)aniline | N,N-bis-(2-hydroxyethyl-)aniline | orange | 462 nm |
| 104 | 4-(2-hydroxyethyl-sulfonyl-)aniline | N,N-bis-(2-hydroxyethyl)-3-methyl-aniline | orange | 471 nm |
| 105 | 4-(2-hydroxyethyl-sulfonyl-)aniline | N,N-bis-(2-hydroxypropyl-)aniline | orange | 463 nm |
| 106 | 4-(2-hydroxyethyl-sulfonyl-)aniline | N,N-bis-(2-hydroxybutyl-)aniline | orange | 463 nm |
| 107 | 4-(2-hydroxyethyl-sulfonyl-)aniline | N,N-bis-(2-hydroxyethyl)-3-acetyl-aminoaniline | red orange | |
| 108 | 4-(2-hydroxyethyl-sulfonyl-)aniline | N,N-bis-(2-hydroxyethyl)-2,5-dimethoxyaniline | orange | |
| 109 | 4-(2-hydroxyethyl-sulfonyl-)aniline | N-(2-hydroxyethyl-)aniline | reddish yellow | |
| 110 | 4-(2-hydroxyethyl-sulfonyl-)aniline | N-methyl-N-(2-hydroxyethyl-)-aniline | orange | 459 nm |
| 111 | 4-(2-hydroxyethyl-sulfonyl-)aniline | N-ethyl-N-(2-hydroxyethyl-)aniline | orange | 460 nm |
| 112 | 4-(2-hydroxyethyl-sulfonyl-)aniline | N-(2-cyanoethyl-)N-(2-hydroxy-ethyl-)aniline | orange | 456 nm |
| 113 | 4-(2-hydroxyethyl-sulfonyl-)aniline | 2-(2-hydroxyethylthio-)N,N-bis-(2-hydroxyethyl-)aniline | orange | |
| 114 | 4-(2-hydroxyethyl-sulfonyl-)aniline | N-benzyl-N-(2-hydroxyethyl-)-aniline | orange | 458 nm |
| 115 | 4-(2-hydroxyethyl-sulfonyl-)aniline | N,N-bis-(2-(2-Hydroxyethyloxy)-ethyl-)aniline | orange | 464 nm |
| 116 | 3-(2-hydroxyethyl-sulfonyl-)aniline | N,N-bis-(2-hydroxyethyl-)-3-methylaniline | reddish yellow | 451 nm |
| 117 | 3-(2-hydroxyethyl-sulfonyl-)aniline | 2-(2-hydroxyethylthio-)N-(2-hydroxyethyl-)aniline | reddish yellow | 428 nm |
| 118 | 2-(2-hydroxyethylsulfonyl-)-aniline | N,N-bis-(2-hydroxyethyl-)3-methyl-aniline | orange | 467 nm |
|  | 2-(2-hydroxyethylsulfonyl-)-aniline | 2-(2-hydroxyethylthio-)N-(2-hydroxyethyl-)aniline | reddish yellow | 437 nm |
| 119 | 4-(2-hydroxyethylsulfonyl)-3-methylaniline | 2-(2-hydroxyethylthio-)N-(2-hydroxyethyl-)aniline | reddish yellow | 436 nm |
| 120 | 4-(2-hydroxyethylsulfonyl)-3-chloraniline | 2-(2-hydroxyethylthio-)N-(2-hydroxyethyl-)aniline | reddish yellow | 440 nm |
| 121 | 6-(2-hydroxyethylsulfonyl-)-naphthyl-2-amine | 2-(2-hydroxyethylthio-)N-(2-hydroxyethyl-)aniline | reddish yellow | 402 nm |
|  | 6-(2-hydroxyethylsulfonyl-)-naphthyl-2-amine | N,N-bis-(2-hydroxyethyl-)3-methylaniline | orange | 474 nm |
| 122 | 4-(2-hydroxyethylsulfonyl-methyl)-aniline | N,N-bis-(2-hydroxyethyl-)3-methylaniline | yellow | |
| 123 | 4-[2-(2-hydroxyethyl-sulfonyl-)ethyl-]aniline | N,N-bis-(2-hydroxyethyl-)3-methylaniline | yellow | |
| 124 | 4-(2-hydroxyethylsulfonyl-)-aniline | 3-(2-hydroxyethylthio-)N-(2-hydroxyethyl-)aniline | reddish yellow | |

EXAMPLE 127

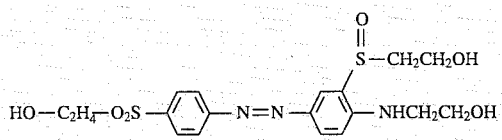

A suspension of 140 g of the dyestuff from Example 95 is adjusted to pH 3–4 in a solution of 2000 ml of water and 100 g of sodium chloride using 4.1 g of sodium acetate and 3.0 ml of acetic acid and is then stirred with 0.2 g of tungsten(VI) oxide and 140 ml of 35% strength hydrogen peroxide for 12 hours at room temperature. The resulting precipitate is filtered off with suction and washed well with water. 120 g of the dyestuff of the above formula are obtained. $\lambda_{max}$ (DMF): 420 nm.

The same result is obtained if 76 g of 4-(2-hydroxyethylsulphonyl)-aniline are diazotised and coupled at 10° C. and pH 3–4 with 102 g of 2-(2-hydroxyethylthio)-N-(2-hydroxyethyl)-aniline (80% strength product) and the dyestuff suspension thus obtained is oxidised with 140 ml of hydrogen peroxide and 0.2 g of tungsten(VI) oxide for 12 hours at room temperature.

The resulting dyestuff is used for colouring analogously to Examples 95 to 102, reddish-tinged yellow colourings being obtained.

EXAMPLE 128

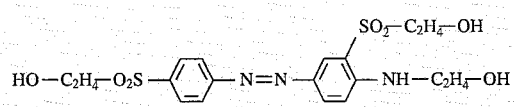

Analogously to the preparation in Example 127 the oxidation is carried out for 1 hour at 85° C. Yield: 123 g, $\lambda_{max}$ (DMF): 411 nm. When coloured in accordance with Examples 1 to 8, reddish-tinged yellow colourings are obtained.

EXAMPLES 129 TO 138

If further thioethers are reacted analogously to Examples 127 to 128 to give sulphoxides or sulphones and these are used to colour polyurethane plastics analogously to Example 95–102, dyestuffs of the formula

| Ex. | D | K | Hue | $\lambda_{max}$ (DMF) |
|---|---|---|---|---|
| 129 | 4-(2-hydroxyethylsulfonyl-)-phenyle | 2-(2-hydroxyethylsulfoxidyl)-N,N-bis-(2-hydroxy-)-aminophenyl-(4) | reddish yellow | |
| 130 | 4-(2-hydroxyethylsulfonyl-)-phenyle | 2-(2-hydroxyethylsulfonyl)-N,N-bis-(2-hydroxy-)-aminophenyl-(4) | reddish yellow | |
| 131 | 4-(2-hydroxyethylsulfonyl-)-phenyle | 3-(2-hydroxyethylsulfoxidyl)N-(2-hydroxyethyl-)-aminophenyl-(4) | reddish yellow | |
| 132 | 4-(2-hydroxyethylsulfonyl-)-phenyle | 3-(2-hydroxyethylsulfonyl-)N-(2-hydroxyethyl-)-aminophenyl-(4) | reddish yellow | |
| 134 | 3-(2-hydroxyethylsulfonyl-)-phenyle | 2-(2-hydroxyethylsulfoxidyl-)N-(2-hydroxyethyl-)-aminophenyl-(4) | reddish yellow | 413 nm |
| 135 | 3-(2-hydroxyethylsulfonyl-)-phenyle | 2-(2-hydroxyethylsulfonyl-)N-(2-hydroxyethyl-)-aminophenyl-(4) | reddish yellow | 403 nm |
| 136 | 2-(2-hydroxyethylsulfonyl-)-phenyle | 2-(2-hydroxyethylsulfonyl-)N-(2-hydroxyethyl-)-aminophenyl-(4) | reddish yellow | 411 nm |
|  | 2-(2-hydroxyethylsulfonyl-)-phenyle | 2-(2-hydroxyethylsulfoxidyl-)N-(2-hydroxyethyl-)-aminophenyl-(4) | reddish yellow | 421 nm |
| 137 | 6-(2-hydroxyethylsulfonyl-)-naphthyl-2 | 2-(2-hydroxyethylsulfoxidyl-)N-(2-hydroxyethyl-)-aminophenyl-(4) | reddish yellow | 422 nm |
| 138 | 6-(2-hydroxyethylsulfonyl-)-naphthyl-2 | 2-(2-hydroxyethylsulfonyl-)N-(2-hydroxyethyl-)-aminophenyl-(4) | reddish yellow | 413 nm |

We claim:

1. A process for the preparation of a water-soluble reactive dye of structure (1):

$$A-(SO_2X)_{1 \text{ or } 2} \quad (1)$$

wherein

A is a chromophoric azo, polyazo, anthraquinone or formazane radical, and

X is a $CH=CH_2$ or $CH_2CH_2OSO_3H$, which comprises oxidizing a mercapto compound of the formula $$A-(S-CH_2-CH_2-OH)_{1 \text{ or } 2}$$

to form a sulphonyl compound of the formula $$A-(SO_2-CH_2-CH_2-OH)_{1 \text{ or } 2},$$

sulphating said compound to produce a sulphate of the formula $$A-(SO_2-CH_2-CH_2-OSO_3H)_{1 \text{ or } 2},$$

or further reacting said compound with a base to produce a vinylsulphonyl compound of the formula $$A-(SO_2-CH=CH_2)_{1 \text{ or } 2}.$$

2. A process according to claim 1, wherein A is

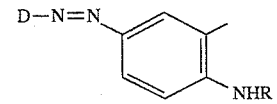

D is a benzene or naphthalene diazo component, which can contain substituents other than OH, $NH_2$, monoalkylamino, dialkylamino and arylamino, and R is H, $C_1$–$C_4$-alkyl, Cl—, OH—, CN—, $CO_2H$—, $OSO_3H$—, $SO_3H$—, $SO_2X$— or $C_1$–$C_4$-alkoxy-substituted $C_1$–$C_4$-alkyl, allyl, benzyl or OH—, $CO_2H$— or sulpho-substituted benzyl.

* * * * *